United States Patent
Chou et al.

(10) Patent No.: US 8,799,931 B2
(45) Date of Patent: Aug. 5, 2014

(54) APPARATUS FOR CONTROLLING AT LEAST ONE ELECTRONIC DEVICE AND RELATED METHOD

(75) Inventors: Li-Ling Chou, Taipei County (TW); Yung-Wei Chen, Taipei (TW)

(73) Assignees: Silicon Motion Inc., keji Chuangyeyuan, Tianan Digital, Futian, Shenzhen, Guangdong Province P.R.C. (TW); Silicon Motion Inc., Jhubei, Hsinchu County (TW)

( * ) Notice: Subject to any disclaimer, the term of this patent is extended or adjusted under 35 U.S.C. 154(b) by 342 days.

(21) Appl. No.: 12/716,245

(22) Filed: Mar. 2, 2010

(65) Prior Publication Data

US 2010/0275220 A1    Oct. 28, 2010

(30) Foreign Application Priority Data

Apr. 24, 2009    (TW) ................................ 98113686 A

(51) Int. Cl.
*G06F 3/00* (2006.01)
*G06F 9/44* (2006.01)

(52) U.S. Cl.
CPC .................................. *G06F 9/4411* (2013.01)
USPC ...................................................... 719/327

(58) Field of Classification Search
CPC .................................................... G06F 9/4411
USPC ................................................. 719/321, 327
See application file for complete search history.

(56) References Cited

U.S. PATENT DOCUMENTS

| | | | |
|---|---|---|---|
| 5,657,474 A * | 8/1997 | Paul Dubois Taine et al. | 711/163 |
| 6,298,397 B1 * | 10/2001 | Maruyama | 710/25 |
| 6,333,684 B1 * | 12/2001 | Kang | 340/7.2 |
| 6,779,004 B1 * | 8/2004 | Zintel | 709/227 |
| 6,940,614 B2 * | 9/2005 | Subramaniam | 358/1.13 |
| 7,500,056 B2 * | 3/2009 | Wheeler et al. | 711/118 |
| 7,861,121 B2 * | 12/2010 | Wang | 714/41 |
| 8,239,883 B2 * | 8/2012 | Saito | 719/321 |
| 2004/0203296 A1 * | 10/2004 | Moreton et al. | 439/894 |
| 2004/0205743 A1 * | 10/2004 | Sugahara | 717/168 |
| 2005/0204355 A1 * | 9/2005 | Yoda et al. | 717/176 |
| 2007/0291552 A1 * | 12/2007 | Khatami et al. | 365/185.33 |

FOREIGN PATENT DOCUMENTS

| | | |
|---|---|---|
| TW | 200836103 | 9/2008 |
| TW | 200910189 | 3/2009 |

OTHER PUBLICATIONS

A James McKnight, Multivariate analysis of age-related driver ability and performatnce deficits, Jul. 13, 1998.*

* cited by examiner

*Primary Examiner* — Lechi Truong
(74) *Attorney, Agent, or Firm* — Winston Hsu; Scott Margo

(57) ABSTRACT

An apparatus for controlling at least one electronic device is coupled to a host. The apparatus includes a controller and a non-volatile storage unit. The controller is controlled by a driver of the host to thereby control the operation of the electronic device. The non-volatile storage unit is externally coupled to the controller and used for storing data. When the driver is activated, it is determined whether the non-volatile storage unit stores a setting data utilized for the driver. If the setting data for the driver is stored in the non-volatile storage unit, the setting data of the driver is read out for setting the driver.

18 Claims, 3 Drawing Sheets

APPARATUS FOR CONTROLLING AT LEAST ONE ELECTRONIC DEVICE AND RELATED METHOD

BACKGROUND OF THE INVENTION

1. Field of the Invention

The present invention relates to a control mechanism that utilizes a driver to control an electronic device, and more particularly, to an apparatus and a related method for controlling an electronic device by setting a driver according to a setting data for the driver read from an external non-volatile storage unit.

2. Description of the Prior Art

A driver is required to drive a controller which is configured for controlling the operation of an electronic device (e.g. an image sensor). A setup package or a setup information file (INF file) of a conventional driver usually includes a setting file, a sensor configuration, a circuit configuration, a driver and a setup executing file. When a user obtains the setup package or the setup information files and executes the setup executing file, parameters included in the setting file will be stored into the registry file of the operating system in order to be utilized by the driver.

Different customers may have different requirements. For meeting all requirements of the different customers, suppliers/manufacturers of controllers modify/update the content of the setup package or the setup information file (e.g. modifying/updating the setting file for the driver). The size of the data amount for the setup package is large, so the modification/update for the setup package is difficult. Furthermore, once the data of the setup information file is modified, a re-certification test is required to ensure that an operation system crush will not occur. This costs both time and money.

SUMMARY OF THE INVENTION

With this in mind, it is therefore one objective of the present invention to provide an apparatus and a related method for controlling an electronic device by reading out setting data stored in an externally-coupled non-volatile storage unit to set a driver, thereby solving the aforementioned problems.

According to one exemplary embodiment of the present invention, an apparatus for controlling at least one electronic device is provided. The apparatus is coupled to a host, and includes a controller and a non-volatile storage unit. The controller is controlled by a driver of the host and is configured for controlling the operation of the electronic device. The non-volatile storage unit is externally coupled to the controller and is utilized for storing data. When the driver is activated, it is determined whether a setting data utilized for the driver is stored in the non-volatile storage unit. If the setting data for the driver is stored in the non-volatile storage unit, the setting data for the driver is read out for setting the driver.

According to one exemplary embodiment of the present invention, a method for controlling at least one electronic device is further provided. The method includes: storing a setting data utilized by a driver in a non-volatile storage unit; and reading out the setting data from the non-volatile storage unit to set the driver when the driver is activated, thereby executing the driver to control the operation of the electronic device.

In summary, the advantage of the present invention is that the manufacturer/supplier does not have to modify or update the content of the installation data of the driver and does not have to modify the driver. The manufacturer/supplier only needs to perform a certification test on the driver of the controller once, which significantly saves on expenses. In addition, with the permission of the manufacturer/supplier, a customer can properly set content of the setting data depending on his/her requirements. When the driver is activated, the modified setting data can be employed for modifying/updating the parameter of the driver, thereby updating/increasing additional control function(s) or operation(s) for the electronic device. As a result, the present invention improves the flexibility of usage of the electronic device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . ." The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
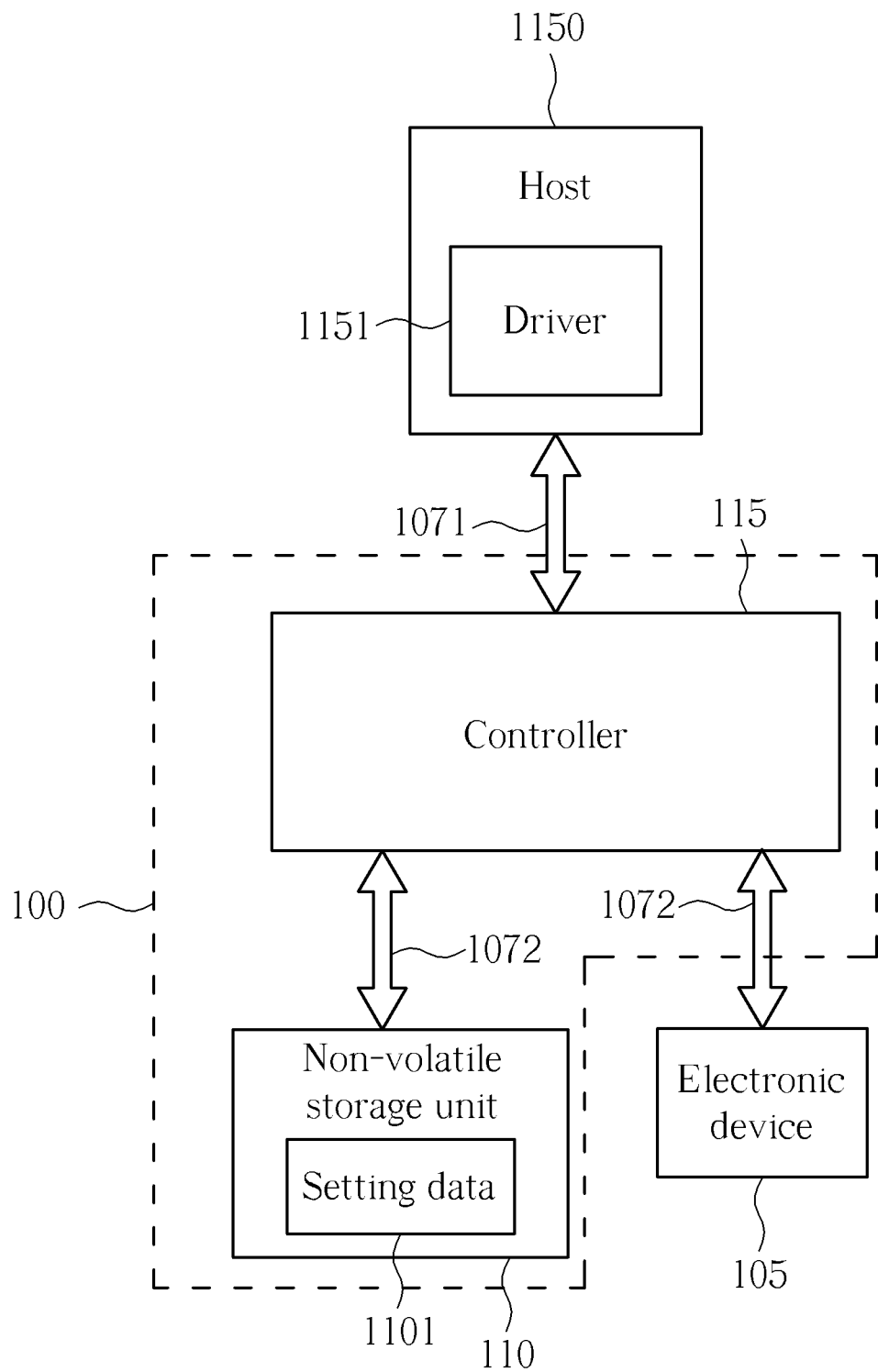
FIG. 1 is a block diagram of an apparatus according to one exemplary embodiment of the present invention.

Please refer to FIG. 1, which depicts a block diagram according to one exemplary embodiment of the present invention. In this exemplary embodiment, an apparatus is utilized for controlling at least one electronic device/computer peripheral 105, such as an image sensor (or an image detecting circuit) or an audio codec. Although the image sensor is utilized for explaining how an apparatus 100 controls the electronic device 105 in the following paragraph, it is not a limitation of the present invention. That is, the electronic device 105 could be any other circuit component in addition to the image sensor and the audio codec. A host 1150 is coupled to the apparatus 100 through an external bus 1071, and the host 1150 could be a PC. After a driver 1151 (which provides at least the fundamental function and operation) is installed on the host 1150, the host 1150 can execute the driver 1151 to control a controller 115 through the external bus 1071 (e.g. Universal Serial Bus, USB). For instance, the host 1150 executes the driver 1151 to determine an operation mode for the controller 115 by setting the register (not shown) of the controller 115. Through an internal bus 1072, the controller 115 controls the electronic device 105 according to the instructions issued by the host 1151 and the operation mode set by the host 1151.

The apparatus 100 further includes a non-volatile storage unit 110, which is externally coupled to the controller 115 through the internal bus 1072 and utilized for storing a setting data 1101 (hereinafter "driver setting data") for the installation of the driver 1151. The non-volatile storage unit 110 could be implemented with an electrically erasable programmable read-only memory (EEPROM), and the driver setting data 1101 is utilized for setting the driver 1151, thereby adjusting the control of the electronic device 105. For instance, the driver setting data 110 includes the setting file required when the driver 1151 is installed, and the content of the driver setting data 110 could be utilized for modifying parameters in the driver 1151, where the parameters concern the fundamental operation and function, or could be utilized for extending the operations or functions of the driver 1151 by increasing additional operations and functions. In short, the function of the driver setting data 1101 is similar to the setting file of the driver. In this embodiment, the controller 115 reads out the driver setting data 1101 from the non-volatile storage unit 110 for setting the driver 1151 when the host activates (installs or executes) the driver 1151.

In this invention, the manufacturer/supplier modifies or updates the content of the driver setting data 1101 (e.g. information about the parameters in the driver 1151) depending on requirements of different customers in order to provide customized services. A specific driver (e.g. a kernel mode driver) can be installed on a controller with a setup information file or a setup package.

With respect to the driver installation method of the setup information file, the setup information file (including the driver and the driver setting data) needs to be certified by a system stability and compatibility certification process (e.g. Windows Hardware Quality Lab (WHQL) process) before the driver is installed. This ensures that the driver will not lead to the operating system crashing. With respect to the driver installation method of the setup package, the setup package does not need to be certified by a system stability and compatibility certification process.

In this embodiment, since the driver setting data 1101 is stored in the non-volatile storage unit 110, the controller 115 loads the driver setting data 1101 from the non-volatile storage unit 110 in order for the host 1150 to set the driver 1151 when the driver 1151 is activated (installed) regardless of the installation method. Thus, the manufacturer/supplier of the apparatus can provide the driver 1151 having identical content and the driver setting data 1101 having different content to different customers having different requirements. That is, the manufacturer/supplier only needs to modify/update the content of the driver setting data 1101 rather than the content of the driver.

In other words, for satisfying different requirements or updating the driver setting data, no matter whether the driver is installed with the setup package or the setup information file, the present invention only modifies/updates the content of the driver setting data 1101 and then executes the driver 1151, thereby setting the driver with newly-modified/updated driver setting data. The manufacturer/supplier does not need to develop a new setup package or a new setup information file, which can save on expenses for re-certifying a new setup information file (only one certification is necessary in this invention) and the time for installing a new setup package.

In practice, apart from the setting data 1101 of the driver being read out from the non-volatile storage unit 110, it is also feasible to load a registry file of the operating system and read out predetermined setting data temporarily stored in the registry file in order to install the driver 115, wherein the predetermined setting data is copied from the setup package or the setup information file when the driver 115 is installed. Hence, if the driver setting data 1101 stored in the non-volatile storage unit is deleted or an error occurs when the driver 115 accesses the non-volatile storage unit 110, the apparatus 100 can still control the operation of the electronic device 105 by loading the predetermined setting data temporarily stored in the registry file. It should be especially noted that, even though the driver setting data 1101 is used to set the certified driver 1151 which has been certified by the certification process, other information regarding the electronic device 105 (e.g. the image detecting circuit) can also be stored in the non-volatile storage unit 110, wherein the information could be the sensor information or the circuit configuration information. However, such information is not relevant to the parameters utilized for setting the driver 1151 when the driver 1151 is installed or executed.

Figure 2:
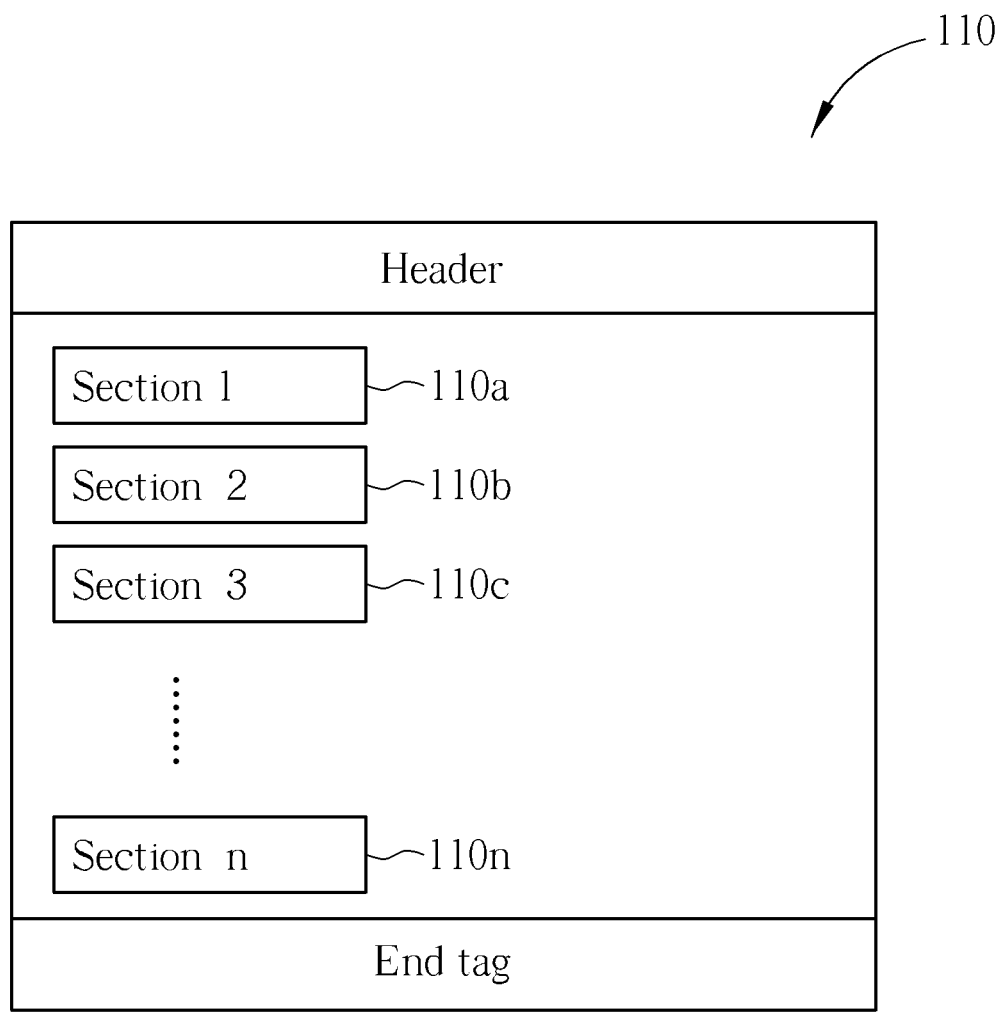
FIG. 2 is a detailed diagram of the non-volatile storage unit as shown in FIG. 1.

Please refer to FIG. 2, which depicts a diagram of the non-volatile storage unit 110. As shown in FIG. 2, the non-volatile storage unit 110 consists of a plurality of data storage sections, such as sections 110*a*-110*n*. In this embodiment, the first data storage section (i.e. the starting data storage section) in the storage space of the non-volatile storage unit 110 is used for storing the driver setting data 1101. Therefore, the driver 1151 is only executed to perform access to the driver setting data 1101 with a fixed address of the first data storage section and it is unnecessary to perform data searching or data parsing. The reason why the driver setting data can be accessed at the fixed address is that the data size of the header of the storage space in the non-volatile storage unit 110 is constant, which makes the physical starting address of the first data storage section a fixed address.

In other embodiments of the present invention, it is also possible to store the driver setting data 1101 into other sections in the storage space of the non-volatile storage unit 110. In this case, if the controller 115 is not informed of the data storage section where the driver setting data 1101 is stored, the controller 115 has to perform a data search in advance in order to find out the particular data storage section. Moreover, if the other firmware inside the controller 115 accesses the non-volatile storage unit 110, the controller 115 will skip the data storage section (e.g. the starting data storage section) where the driver setting data 1101 is stored so as to prevent accessing/modifying the content of the driver setting data 1101.

Figure 3:
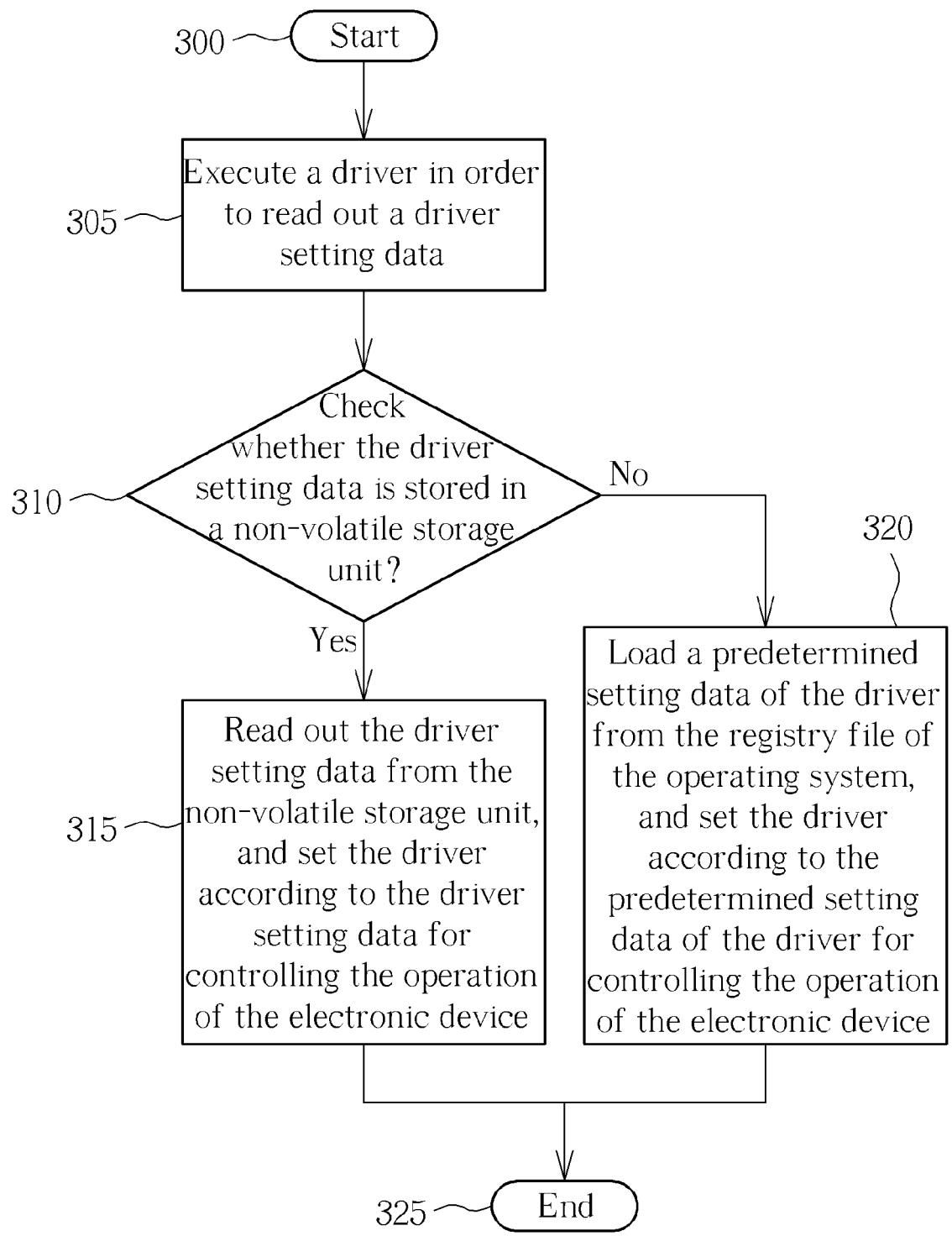
FIG. 3 is a flow chart showing the detailed operation of the apparatus shown in FIG. 1.

Please refer to FIG. 3, which depicts a flow chart including steps of the operation of the apparatus 100 shown in FIG. 1. Provided the result is substantially the same, the steps of the operation of the apparatus 100 are not limited to be executed according to the exact order shown in FIG. 3 and are not limited to be executed contiguously; that is, additional steps can be intermediate. The detailed description of the steps of the operation is explained in the following.

Step 300: Start;

Step 305: Execute the driver 1151 in order to read out a driver setting data (e.g. a driver setting file) for setting the driver 1151;

Step 310: The driver 1151 checks whether a driver setting data 1101 is stored in the non-volatile storage unit 110. If yes, step 315 will be executed; otherwise, step 320 will be executed;

Step 315: When it is determined that the driver setting data 1101 is stored in the non-volatile storage unit 110, the controller 115 reads out the driver setting data 1101, and sets the driver 1151 according to the driver setting data 1101 for controlling the operation of the electronic device 105;

Step 320: Load a predetermined setting data of the driver 1151 from the registry file of the operating system, and set the driver 1151 according to the predetermined setting data of the driver 1151 for controlling the operation of the electronic device 105;

Step 325: End.

In another exemplary embodiment, to prevent the driver 1151 from being illegally used, a specific password is added in the driver setting data 1101. When the driver 1151 is activated (installed), the controller 115 or the host 1150 reads out the password from the driver setting data 1101 and then checks the password. If the controller 115 or the host 1150 cannot detect the password or finds out the password is incorrect, the installation of the driver 1151 will be suspended, which causes the controller 115 to be unable to operate in accordance with the driver 1151. Consequently, the barrier to illegal usage of the driver 1151 is increased to increase security.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

In summary, the advantage of the present invention is that the manufacturer/supplier does not have to modify or update the content of the installation data of the driver and does not have to modify the driver. The manufacturer/supplier only needs to perform a certification test on the driver of the controller once, which significantly saves on expenses. In addition, with the permission of the manufacturer/supplier, a customer can properly set the content of the setting data depending on his/her requirements. When the driver is activated, the modified setting data can be employed for modifying/updating the parameter of the driver, thereby updating/increasing additional control function(s) or operation(s) for the electronic device. As a result, the present invention improves the flexibility of usage of the electronic device.

Those skilled in the art will readily observe that numerous modifications and alterations of the device and method may be made while retaining the teachings of the invention.

What is claimed is:

1. An apparatus for controlling at least one electronic device, the apparatus being coupled to a host, the apparatus comprising:
   a controller, controlled by a driver of the host, for controlling an operation of the electronic device; and
   a non-volatile storage unit, externally coupled to the controller, for storing data;
      wherein it is determined whether a setting data utilized for the driver is stored in the non-volatile storage unit when the driver is activated; and when the determination is positive, the setting data is read out for setting the driver; the operation of the electronic device can be modified by modifying the setting data without re-installing and changing/modifying the driver, and functions of the electronic device are extended by modifying the setting data without re-installing and changing/modifying the driver;
      wherein the setting data for the driver is stored in a specific data storage section of the non-volatile storage unit, and the controller reads out the setting data from the specific data storage section by referring to a fixed address of the specific data storage section without performing a data search on the non-volatile storage unit;
      wherein the specific data storage section is a starting data storage section in storage space of the non-volatile storage unit.

2. The apparatus of claim 1, wherein content of the setting data for the driver is designed or updated according to requirements of different customers.

3. The apparatus of claim 1, wherein the driver is a kernel mode driver and the driver is installed on the host with a setup information file (INF file) and a system stability and compatibility certification process performs a certification test on the driver without performing the certification test on the setting data for the driver before the driver is installed on the host.

4. The apparatus of claim 3, wherein the system stability and compatibility certification process only performs the certification test on the driver once.

5. The apparatus of claim 1, wherein the driver is a kernel mode driver and the driver is installed on the host with a setup package, and a system stability and compatibility certification process does not perform a certification test on the driver and the setting data for the driver before the driver is installed on the host.

6. The apparatus of claim 1, wherein the electronic device is a computer peripheral.

7. The apparatus of claim 1, wherein the non-volatile storage unit further stores a password and the controller reads out the password from the non-volatile storage unit to finish an installation of the driver when the driver is activated.

8. The apparatus of claim 1, wherein the controller loads a predetermined setting data for the driver from a registry file of the operating system to set the driver if the controller determines that the setting data for the driver is not stored in the non-volatile storage unit.

9. The apparatus of claim 1, wherein the setting data stored in the non-volatile storage unit is read out for setting the driver when the driver is being installed.

10. A method for controlling at least one electronic device, comprising:
   storing a setting data utilized for a driver in a non-volatile storage unit;
      comprising storing a configuration data in a specific data storage section of the non-volatile storage unit, wherein the specific data storage section is a staring data storage section in storage space of the non-volatile storage unit;
      and
   reading out the setting data from the non-volatile storage unit to set the driver when the drive is activated, thereby executing the driver to control an operation of the electronic device; wherein reading out the setting data from the specific data storage section of the non-volatile storage unit is performed by referring to a fixed address of the specific data storage section without performing a data search on the non-volatile storage unit;
      wherein the operation of the electronic device can be modified by modifying the setting data without re-installing and changing/modifying the driver, and functions of the electronic device are extended by modifying the setting data without re-installing and changing/modifying the driver.

11. The method of claim 10, further comprising:
   designing or updating content of the setting data according to requirements of different customers.

12. The method of claim 10, wherein the driver is a kernel mode driver and the method comprises:
   installing the driver with a setup information file (1NF file); and utilizing a system stability and compatibility certification process to perform a certification test on the driver without performing the certification test on the setting data for the driver before the driver is installed.

13. The method of claim 12, wherein the step of utilizing the system stability and compatibility certification process to perform the certification test on the driver is only executed once.

14. The method of claim 10, wherein the driver is a kernel mode driver and the method comprises: installing the driver with a setup package; and directly utilizing the driver and the setting data for the driver which are not certified by a system stability and compatibility certification process.

15. The method of claim 10, wherein the electronic device is a computer peripheral.

16. The method of claim 10, wherein the non-volatile storage unit further stores a password, and the password is read out from the non-volatile storage unit to finish an installation of the driver when activating the driver.

17. The method of claim 10, wherein a predetermined setting data for the driver is loaded from a registry file of the operating system to set the driver if the setting data for the driver is not stored in the non-volatile storage unit.

18. The method of claim 10, further comprising:
reading out the setting data from the non-volatile storage unit for setting the driver when the drive is being installed.

* * * * *